United States Patent
Klauk et al.

[11] Patent Number: 5,865,028
[45] Date of Patent: Feb. 2, 1999

[54] ENERGY RECOVERY DEVICE

[75] Inventors: Bernd Klauk, Dudweiler; Josef Scholl, Tholey; Herbert Baltes, Losheim, all of Germany

[73] Assignee: Hydac Technology GmbH, Sulzbach, Germany

[21] Appl. No.: 817,606

[22] PCT Filed: Oct. 20, 1995

[86] PCT No.: PCT/EP95/04133

§ 371 Date: Apr. 21, 1997

§ 102(e) Date: Apr. 21, 1997

[87] PCT Pub. No.: WO96/12596

PCT Pub. Date: May 2, 1996

[30] Foreign Application Priority Data

Oct. 20, 1994 [DE] Germany .......................... 44 37 598.0

[51] Int. Cl.[6] .................................................. F16D 31/02
[52] U.S. Cl. ............................................... 60/413; 60/494
[58] Field of Search .............................. 60/413, 468, 494, 60/420

[56] References Cited

U.S. PATENT DOCUMENTS

| 4,341,149 | 7/1982 | Dezelan | 60/413 X |
| 4,353,286 | 10/1982 | Wetter | 60/413 X |
| 4,953,723 | 9/1990 | Saotome et al. | 60/413 X |
| 4,995,517 | 2/1991 | Saotome | 60/413 X |
| 5,477,677 | 12/1995 | Krnavek | 60/494 X |
| 5,513,491 | 5/1996 | Broenner et al | 60/494 X |

FOREIGN PATENT DOCUMENTS

| 2517382 | 6/1983 | France . |
| 1180680 | 10/1964 | Germany . |
| 1193877 | 5/1965 | Germany . |
| 29502919 | 8/1995 | Germany . |
| 1540174 | 2/1979 | United Kingdom . |
| 9311363 | 6/1993 | WIPO . |

*Primary Examiner*—Hoang Nguyen
*Attorney, Agent, or Firm*—Roylance, Abrams, Berdo & Goodman, L.L.P.

[57] ABSTRACT

An energy recovery device, in particular of static and kinetic energy, has at least one hydraulically controlled working cylinder (110) or a hydraulic engine (210) that moves tools back and forth, preferably up and down. The working cylinder (110) or the hydraulic engine (210) can be connected to a hydraulic circuit (132) with a pump (134) and to a hydraulic accumulator (138) by a connection line (136). The connection line (136) contains two hydraulically controlled check valves (140, 142) controlled by a control unit, in particular a distributing valve (144), depending on the displacement of the tools or on the state of motion of the working unit. This energy recovery device does not have the disadvantages due to the use of conventional cartridge valves, and is cheap and reliable to operate.

22 Claims, 2 Drawing Sheets

ENERGY RECOVERY DEVICE

FIELD OF THE INVENTION

The present invention relates to a device for recovery of energy, especially of static energy in working cylinders or engines. At least one hydraulically operable working cylinder for different movements implemented by turns, preferably for raising and lowering working tools, is connectable to the piston side of a hydraulic circuit with a pump and through a connecting line to a hydraulic accumulator. The present invention also relates to a device for recovery of kinetic energy using at least one hydraulic engine for controlling a working unit, which device is connectable in a hydraulic circuit having a pump and through a connecting line to a hydraulic accumulator.

BACKGROUND OF THE INVENTION

A device for recovery of static energy from working engines is disclosed in PCT/WO 93/11363. Two hydraulically operable working cylinders execute the raising and lowering of the working tool, and are connected in fluid communication at the rod end one below the other. In this known device, the piston chamber of the hydraulically operable working cylinder is connected with the hydraulic accumulator through a cartridge-valve cooperating with a distributor of control energy, which distributor is connected to a pressure relay as part of a control arrangement. This control arrangement is connected by its control input to a low pressure branch of the hydraulic circuit, which cooperates with the movable parts of the working engine in the form of the working tools. Using this known device, upon lowering the working tool, the quantity of fluid on the piston side of the working cylinder can be discharged with inclusion of the static energy under pressure which is being dissipated at the hydraulic accumulator. From the hydraulic accumulator, the energy can be drawn back again exactly quantifiably for the subsequent raising of the working tool. By this means, greater amounts of energy can be recovered than with the devices known until this time.

Despite the good energy recovery behavior of this known device, it has certain drawbacks. In this device, while holding the working tool, following a lowering procedure, the cartridge-valve is inclined to "flutter". Therefore, the working tool, usually in the form of an extended arm, begins to luff. This undesired movement of the working tool can be lessened only with inclusion of a very costly control device mounted on its periphery. With lowering of the working tool under a load, the cartridge-valve opens in sudden, erratic bursts. When the hydraulic accumulator is emptied and there is a high load thrust. A slow lowering for a small stretch, for example for a few millimeters, cannot be executed. There is also lessened capacity for working. Thus, additional force is required to accomplish the lowering procedure, since the hydraulic accumulator with increasing fluid filling works counter to this force and reduces the effect of the force during lowering procedure.

In another known device for recovery of energy, disclosed in EP 0 230 529 B1, an identical cartridge-valve is used especially for recovery of hydrostatic braking energy in motor-powered vehicles, such as trucks or buses. In addition to the cartridge-valve, the valve arrangement of this known device for energy recovery also requires a multi-way valve and three impedances arranged at various points in the circuit, which in all heightens the susceptibility to interference of this known device.

SUMMARY OF THE INVENTION

Objects of the present invention are to provide a device for recovery of energy which does not have the drawbacks arising from use of a cartridge-valve, which is still of lower cost and which is reliable in its operation.

The foregoing objects are basically obtained by a device for recovery of energy comprising a first hydraulically operable working cylinder or engine for moving a working tool. A hydraulic circuit is coupled to the working cylinder or engine and includes a pump in fluid communication with a hydraulic accumulator through a connecting line. Two hydraulically openable non-return valves are arranged in the connecting line. A control unit is coupled to the non-return valves and control the non-return valves alternatively and independently. The control unit includes a first multi-way valve responsive to movement of the working tool.

Through the multi-way valve during movement in the one direction, especially with lowering of the working tool, one non-return valve is controlled by the pump pressure in a manner that the hydraulic accumulator is filled on the fluid side from the working cylinder. With the counter-movement or raising process, the other non-return valve is controlled in the same manner, so that the amount of fluid or energy stored in the hydraulic accumulator and measured again on the working cylinder can be discharged.

Through the two openable non-return valves working counter to one another, the working cylinder connected to the hydraulic accumulator can be uncoupled safely therefrom. When holding the working tool is under a load, no luffing can occur any longer and slow millimetrically precise movement is possible.

In addition, the device according to the invention is formed of only a few, reliably functioning structural parts, which reduces the cost and increases the operational reliability.

With a hydraulic engine cooperating with the working unit, kinetic energy can be stored dependent upon its state of movement and can be subsequently discharged and used. The working unit can thus be a linear drive unit controllable by the hydraulic engine or can serve as a component of the hydrostatic braking energy recovery as a component part of the wheel drive in power vehicles. During vehicle operation, it can discharge accumulated movement energy to the vehicle drive, for example when a vehicle climbs a slope, in order to attain such energy recovery during operation.

With one preferred embodiment of the device according to the present invention, an impedance non-return valve is located in the connecting line between the two openable non-return valves. The impedance non-return valve preferably has a continuously variable cross section. Because of this, controlled lowering of the working tool is possible when the working cylinder is emptied on the piston side, without giving rise to the sudden bursts of opening of the cartridge-valve as described above, which makes slow and millimetrically precise lowering impossible.

In another preferred embodiment of the device of the invention, the two working cylinders are connected with one another on their piston sides through another connecting line, in which are connected an impedance or diaphragm as well as a non-return valve. By use of this circuit arrangement, hydraulic energy can be retrieved from the hydraulic accumulator for one of the working cylinders. Also, simultaneously, the hydraulic pump can support the raising process with or without a load. Hydraulic oil is fed to both of the piston chambers, without causing discharge of the fluid stored in the hydraulic accumulator, which would include escape of the pressure into the other working cylinder.

In another especially preferred embodiment of the device of the present invention, the working cylinder isolated by the hydraulic accumulator is connected on the rod side to a valve arrangement, preferably in the form of a 2/2-way valve. With lowering of the working tool, such valve frees the passage from the piston side to the rod chamber, which is isolatable by means of a non-return valve. In the already described energy recovery device disclosed in PCT-WO 93/11363, the velocity of lowering the working tool is controlled in that the hydraulic oil is fed to the tank through an impedance or a nozzle. With use of the energy recovery device, this volume of oil from one cylinder then flows directly to the hydraulic accumulator whereupon the described impedance or nozzle can no longer be directed toward its objective. This increases the velocity of lowering, so that sufficient hydraulic oil is no longer fed through the piston side to the working cylinder and the procedure for lowering becomes uncontrolled. As a result of the construction according to the present invention, a sort of scavenging device is realized for the rod side, which carries sufficient oil to the rod side, even with lowering at high velocity, that the lowering procedure proceeds under control. Insofar as the hydraulic pump is connected to the rod side of the working cylinder for this lowering procedure, in addition to the reversal of the oil coming out of the piston chamber controlled by the force of gravity, more oil gets out through the 2/2-way valves into the rod chamber and through the hydraulic pump into the same. This allows for lowering of the working tool by rapid return without for that purpose requiring that the pump bring a great volume of oil to the rod side.

In another preferred embodiment of the device of the present invention, in the connecting line which connects the hydraulic accumulator to the one piston chamber, between this and the hydraulically openable non-return valves, is arranged a 3/2-way-valve. In its non-operating setting, that valve frees the fluid-carrying passage between this piston chamber and the openable non-return valves. When using this 3/2-way valve, it is possible for the operator working from the operator's station to disconnect the energy recovery device instantly and completely if necessary. Also, working with decreased working capacity can be avoided by this means, in which an additional force is required for a lowering procedure, without this force being applied countering the force coming out of the hydraulic accumulator.

In another embodiment of the device of the present invention, a multi-way valve is connected between the pump and the relevant working cylinder or the hydraulic engine, preferably a 4/3-way valve, which is in fluid communication with another non-return valve. The closing part is aligned for opening in the same direction as the closing part of the adjacently arranged openable non-return valve. Preferably, in this case, the other non-return valve is arranged to be hydraulically openable by means of another multi-way valve, preferably a 3/2-way valve, or else a pressure limiting valve is arranged between the other openable non-return valve and the hydraulic accumulator.

In a first alternative, upon opening the other non-return valve by means of the other multi-way valve, the hydraulic accumulator is uncoupled when a maximum predeterminable accumulator static pressure is attained. This permits another movement or lowering of the working tool, without this movement countering and retarding the maximum accumulator pressure of the hydraulic accumulator. Thus, the predetermined setting pressure remains constant throughout the duration of operation and additional heat buildup is avoided.

In the second alternative embodiment, after attaining the maximum predeterminable accumulator load pressure by means of the pressure limiting valve, pressure excess is broken down. This has the special advantage that during reversal from one movement situation into the other, no "back-up" is generated. However, the setting pressure does not remain constant through the duration of operation and heat build-up is generated. Dependent upon the intended use, one or the other alternative can be featured and implemented.

In one preferred further construction relating to both of the embodiments of the device of the present invention, the hydraulic accumulator and the connecting line are secured and protected with the openable non-return valves through pressure limiting valves leading to the tank. Any undesired increase of pressure in the hydraulic system is, thus, not dangerous.

Other objects, advantages and salient features of the present invention will become apparent from the following detailed description, which, taken in conjunction with the annexed drawings, discloses preferred embodiments of the invention.

BRIEF DESCRIPTION OF THE DRAWINGS

Referring to the drawings which form a part of this disclosure.

DETAILED DESCRIPTION OF THE INVENTION

Figure 1:
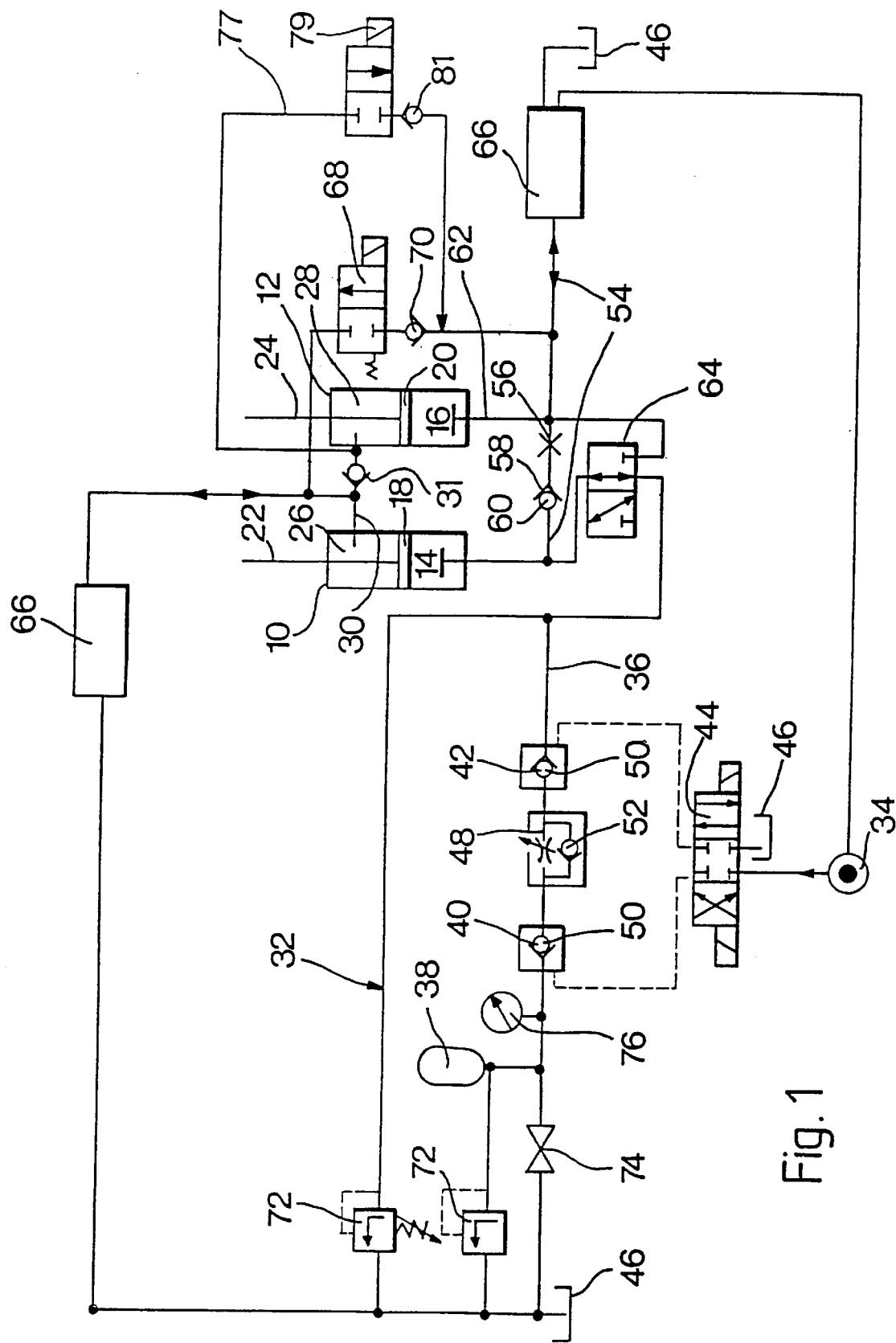
FIG. 1 is a schematic diagram of an energy recovery device according to a first embodiment of the present invention.

A device for recovery of energy, especially of static energy in working machines, according to the first embodiment of the present invention is illustrated in FIG. 1. The device has two hydraulically operable working cylinders 10 and 12 for raising and lowering a working tool. The cylinders are constructed to be essentially identical. Of the two working cylinders 10 and 12, each has a piston chamber 14 or 16 sealed off at the top by a piston 18 or 20. Each piston has a piston rod 22 or 24. The two piston rods 22 and 24 penetrate the rod chambers 26 and 28 in working cylinders 10 and 12, respectively, and are articulated at their free ends with a working tool (not shown). This working tool can be an arm or an overhanging arm or beam. For a working machine in the form of an excavating machine, the arm can be an excavating arm with a shovel or the like. On the rod sides, the two working cylinders 10 and 12 are in fluid connection with one another through a connecting line 30 with a check valve 31. At its ends, line 30 opens into the rod chambers 26 and 28.

The hydraulic circuit, indicated in its entirety as 32, includes a hydraulic pump 34, of conventional construction which need not be described further. Working cylinder 10, illustrated on the left in FIG. 1, is connectable through a connecting line 36 to a hydraulic accumulator 38 of conventional construction. The accumulator can be configured as an injection accumulator, a diaphragm accumulator or a piston accumulator, in which an elastic rubber diaphragm or a piston separates a gas chamber from a liquid chamber. The liquid chamber is connected by a fluid-carrying connection to the hydraulic circuit 32. In connecting line 36 are arranged two hydraulically openable non-return valves 40 and 42, controlled alternatively and independently by a multi-way valve, here in the form of an electrically controllable 4/3-way valve 44, during the raising and lowering of the working tool. This 4/3-way valve 44 is connected to hydraulic pump 34, as well as to the tank 46. Between the two openable non-return valves 40 and 42 in connecting line 36 is an impedance non-return valve 48. Preferably, valve 48, as shown in the diagram, has a continuously variable cross-section. The closing parts 50 or the two openable non-return valves 40 and 42 are arranged facing one another in connecting line 36 and are moved relative to one another in the passage to open settings. The closing part 52 of impedance non-return valve 48 has the same opening direction/arrangement as closing part 50 of the openable non-return valve 40, as shown in the drawing. Instead of impedance non-return valve 48, a volume flow regulator of conventional construction can also be used.

The two working cylinders 10 and 12 are permanently connected to one another at their piston ends through connecting line 54, in which an impedance or diaphragm 56, as well as a non-return valve 58, are connected. The closing part 60 of valve 58 is movable synchronously with the same open setting as the closing part 50 of openable non-return valve 42. Connecting line 54 opens into connecting line 36, with the two openable non-return valves 40 and 42, through a valve, preferably electrically operable 3/2-way valve 64, as well as into a connecting line 62 connected to piston chamber 16 of working cylinder. An extension of connecting line 54 passing out over the intersection point which has been formed opens into a control block 66 designed as a switch box and not specified in greater detail. Control block 66 is in fluid communication on its discharge side with tank 46, and with hydraulic pump 34. Although control block 66 is shown twice in FIG. 21, the two blocks can be joined in function in one switch box. Control block 66 is in the position to provide a fluid-carrying connection between the two working cylinders 10 and 12 on the rod side through connecting line 30 going to tank 46. Control block 66 is manually operable by the operator of the working engine or working tool, for example by means of a so-called joystick, and allows raising and lowering of the relevant working tool.

A valve arrangement is connected on the connecting line 30, which leads to the two rod chambers of the working cylinders and to control block 66. The valve arrangement is preferably in the form of an electrically operable 2/2-way valve 68. With lowering of the working tool, valve 68 frees the fluid-carrying passage from hydraulic pump 34 to rod chamber 28. This passage is closable by a non-return valve 70. In connecting line 30 between rod chambers 26 and 28 of the two working cylinders 10 and 12, another non-return valve 31 is arranged, effectively between working cylinder 12 and the branch of connecting line 30 leading to control block 66. Hydraulic accumulator 38 and connecting line 36, along with openable non-return valves 40 and 42, are secured and protected through a conventional pressure limiting valves 72 leading to tank 46. Hydraulic circuit 32 can be separated from tank 46 by a shutoff valve 74. The pressure in hydraulic circuit 32 is adjustable by means of a manometer 76. Between non-return valve 31 and rod chamber 28, a connecting line 77 opens. A 2/2-way valve 79, as well as a non-return valve 81, are connected in connecting line 77. At its other end, in the direction of flow, line 77 opens in front of non-return valve 70 in connecting line 54.

The device of the present invention, as shown in FIG. 1, is illustrated in a resting state. For lowering the working tool by means of the two working cylinders 10 and 12, the operator moves the 4/3-way valve 44, for example by means of control block 66, in such a manner that valve 44 occupies its partial setting shown to the right in the drawing. When hydraulic pump 34 is being operated, fluid is fed into the connecting line, shown with a broken line, to the openable non-return valve 40 to the move closing part 50 from its seat and to allow fluid to pass through connecting line 36. Openable non-return valve 42 opens as a result of fluid pressure in piston chamber 14 of working cylinder 10. Piston chamber 14 is isolated by non-return valve 58 from piston chamber 16 of the other working cylinder 12. The flow of fluid from piston chamber 14 then passes through the two openable non-return valves 40 and 42 and the impedance point of impedance non-return valve 48, while closing part 52 is closed on the fluid side of hydraulic accumulator 38. The accumulator is prebiased under the effect of a gas cushion.

Fluid from working cylinder 12 in piston chamber 16 can be conducted through connecting lines 62 and 54, as well as control block 66, into tank 46, and/or can form the feed for hydraulic pump 34. In order not to inhibit the downward movement of the two piston rods 22 and 24, the 2/2-way valve 68 is brought into its temporary switch setting shown to the right, so that a connection is formed between connecting line 54 and rod chambers 26 and 28. The fluid flowing out of piston chamber 16 can, therefore, be guided back again into rod chambers 26 and 28, when non-return valve 70 is opened by 2/2-way valve 68. Non-return valve 70 prevents the forming of a vacuum pressure in the rod chambers which could negatively influence the lowering movement of pistons 18 and 20.

With corresponding operation of control block 66, the pressurized fluid from hydraulic pump 34 can be fed into connecting line 54 and can be pumped through 2/2-way valve 68 into rod chamber 28. This operation simplifies the lowering movement. Using the adjustable impedance control allowed by impedance non-return valve 48, the lowering velocity of the piston rods is to a great extent predeterminable. Furthermore, the lowering movement can be terminated in any desired predeterminable setting by means of control block 66.

For a raising process to raise the working tool, valve 44 occupies its switch setting shown to the left in the drawing. Hydraulic pump 34 then opens non-return valve 42. The fluid pressure stored in hydraulic accumulator 38 is now used for energy recovery for the raising procedure. It also controls non-return valves 40 and 42. The volume of fluid stored in hydraulic accumulator 38 then passes under pressure through connecting line 36 and 3/2-way valve 64, in its switch setting shown in the drawing, into bottom piston chamber 14 and supports the raising procedure of working cylinder 10. Fluid pressure to working cylinder 12 from hydraulic accumulator 38 does not occur, since the relevant connecting line 34 remains closed by non-return valve 58 with its closing part 60 is a closed position.

To support the raising procedure, however, fluid under pressure is discharged through hydraulic pump 34 with corresponding operation of control block 66 to reach bottom piston chamber 16 of working cylinder 12. Dependent upon he pressure generation behavior occurring in the two working cylinders 10 and 12, over the impedance or diaphragm 56, under the control of non-return valve 58, piston chamber 14 of first working cylinder 10 can also be supplied with fluid conveyed from hydraulic pump 34. Supply of fluid to the rod side does not occur, since 2/2-way valve 68 is again positioned in its closing setting shown in the drawing, which closes off the resulting connecting passage. Rather, control block 66 provides that an essentially pressureless connection between the two rod chambers 26 and 28 through connecting line 30 to tank 46. With upward movement of piston rods 22 and 24 with pistons 16 and 18, the fluid stored in rod chambers 26 and 28 can flow out without obstruction. With the raising process, multi-way valve 68 remains in its illustrated setting and multi-way valve 79 is switched into flowthrough setting. The oil or fluid can then flow from the rod side to the piston side, with the advantage that the pump need pump in less oil and is available for other procedures, such as rotation of the device.

With this raising procedure, the energy stored in hydraulic accumulator 38 is then discharged back to the raising device to raise the working tool. The energy was stored during the lowering process. In the sense of energy savings, the entire raising energy is not applied from the associated hydraulic pump of the working machine for the raising procedure.

Figure 2:
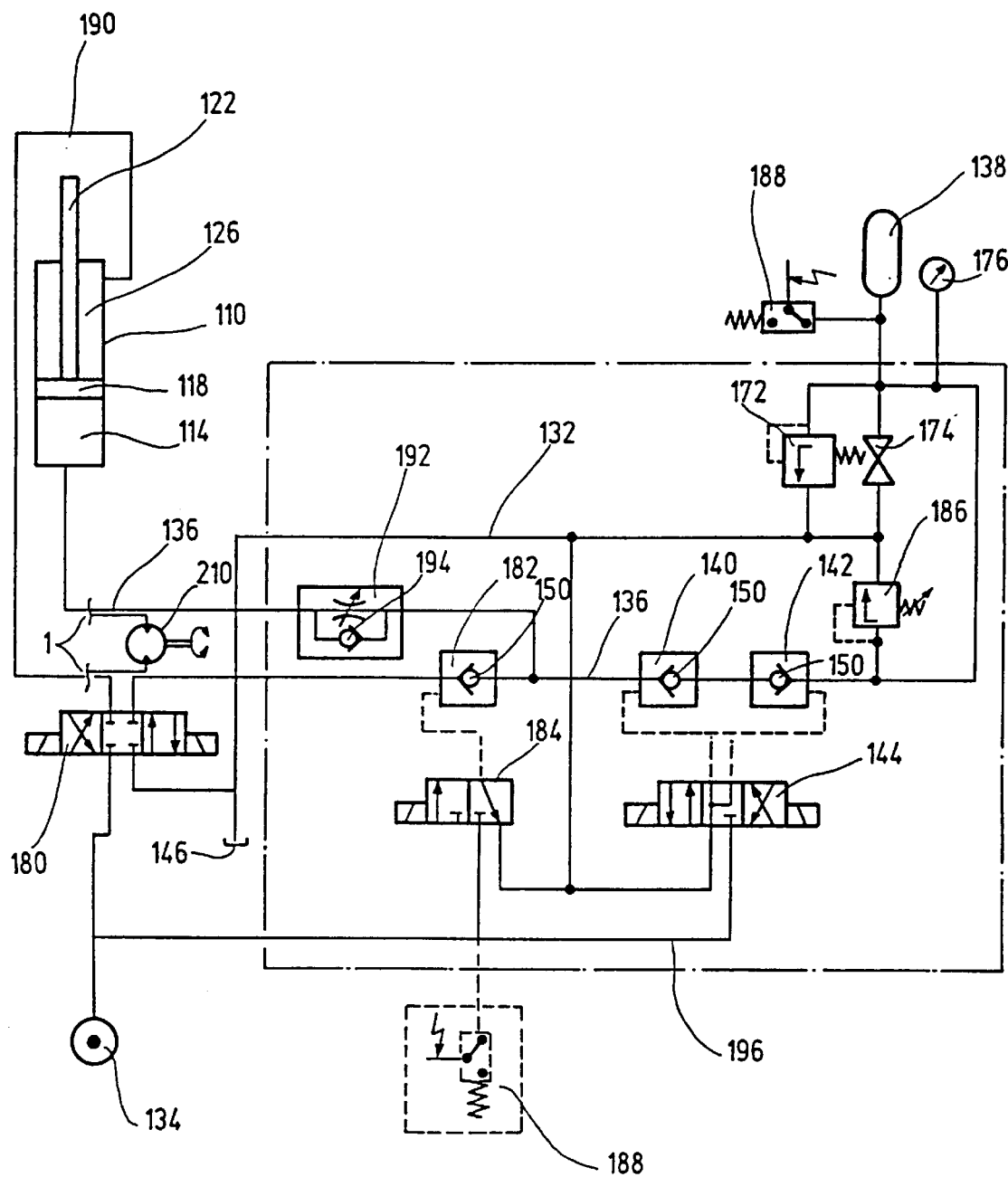
FIG. 2 is a schematic diagram of an energy recovery device according to a second embodiment of the present invention.

In the second embodiment, illustrated in FIG. 2, components and parts which correspond to the first embodiment are identified with a similar number increased by 100. Descriptions of the first embodiment also correspond for the second embodiment. The following describes only the significant differences from the first embodiment.

In the second embodiment, only one single working hydraulic cylinder 110 is used for movement of the working tool, especially for raising and lowering of the same. Insofar as the rod chamber 126 is connected, as shown in FIG. 2, through a fluid-carrying connection to a rod chamber of another working cylinder (not shown). Working cylinder 110 is connected on its piston side to the connecting line 136. Two working cylinders can also be used to provide the movement. Consequently, with the resulting parallel connections, as many other working cylinders (not shown) as desired can be used to control the movement of a working tool.

In the second embodiment, working cylinder 110 is connected with its rod chamber 126 through a connecting line 190 to a multi-way valve 180 in the form of a 4/3-way valve. This multi-way valve 180 is, in turn, connected in fluid communication with hydraulic pump 134. A subsidiary branch 196 in this connection leads to the previously described 4/3-way valve 144 for the opening of the two non-return valves 140 and 142. Multi-way valve 180, furthermore, has connections to tank 146, as well as to another non-return valve 182 having a closing part 150. Piston chamber 114 opens into a connecting line 136, leading to non-return valves 140 and 182. An impedance 192 with variable diameter cross-section, which is secured and protected through a non-return valve 194, is connected in the part of connecting line 136 leading to piston chamber 114.

In one construction of the embodiment of FIG. 2, the other non-return valve 182 is hydraulically openable by a multi-way valve in the form of a 3/2-way valve 184 connected to a pressure switch 188. Pressure switch 188, shown at the bottom of FIG. 2, corresponds to pressure switch 188 shown at the top right of FIG. 2, and is connected to a connecting line of hydraulic accumulator 138 for setting the predeterminable maximum accumulator load pressure. Consequently, the 3/2-way valve 184 is connected to 4/3-way valve 144, and has another connection extending into connecting line 196 between 4/3-way valve 144 and pump 134. In such construction, the pressure limiting valve 186 between non-return valve 142 and the accumulator connection can be relinquished.

In operation for lowering of the working tool and with the introduction of working cylinder 110, multi-way valve 180 is positioned in its right switch setting and multi-way valve 144 is positioned in its left switch setting. The 3/2-way valve 184, with at least partially emptied hydraulic accumulator 138, remains in its switch setting shown in FIG. 2. With lowering of piston 118, the fluid now flows out of piston chamber 114 through connecting line 136 and impedance 192 to non-return valve 140. Upon closing or non-return valve 182, non-return valve 140 is controlled by the fluid pressure generated in connecting line 136. Likewise, non-return valve 142 is hydraulically controlled, unsealed, and thus, opened by multi-way valve 144. Consequently, upon lowering, hydraulic accumulator 138 is filled with hydraulic oil. A securing and protection of hydraulic accumulator 138 occurs through pressure limiting valve 172. The pressure increase can be read on manometer 176. The lowering velocity of piston rod 122 can be controlled with an impedance 192 with variable cross-section controlled by the operator.

With increasing filling of hydraulic accumulator 138, this filling provides a resistance countering any other filling. The filling also makes difficult and slows the desired lowering of piston rod 122. Pressure switch 188 can monitor this state. When a predeterminable pressure threshold valve in hydraulic accumulator 138 is attained, switch 188 causes multi-way valve 184 to be brought into its left switch setting. The closing part 150 of the other non-return valve 182 is controlled through pump 134 and connecting line 196 to free the passage through multi-way valve 180 to tank 146. With further lowering upon uncoupling of hydraulic accumulator 138, the associated fluid volume from piston chamber 114 dissipates in tank 146. Lowering of piston rod 122 without obstruction can be attained in this manner. This is supported still further in that pump 134 supplies fluid under pressure through multi-way valve 180 into rod chamber 126 and supports the lowering movement of piston 118.

In another variation of the second embodiment, both pressure switch 188 and 3/2-way valve 184 are deleted. Instead of this arrangement, a pressure limiting valve 186 is connected between the connection of hydraulic accumulator 138 and the placement of non-return valve 142. This discharges fluid to tank 142 through connecting line 132, as soon as a certain predeterminable filling pressure has been reached in hydraulic accumulator 138, and consequently the pressure limiting valve 186 is connected through.

For raising the working tool, especially for extension of piston rod 122, multi-way valve 180 is brought into its left switch setting and multi-way valve 144 is brought into its right switch setting, according to the representation in FIG. 2. Multi-way valve 184 simply remains in its switch setting shown in FIG. 2. Fluid under pressure is fed to piston chamber 114 through pump 134 and to multi-way valve 180, as well as through non-return valves 182 and 194 controlled by the fluid pressure. Furthermore, non-return valve 140 is controlled. The releasing hydraulic accumulator 138 opens non-return valve 142, so that fluid stored in the accumulator under pressure is likewise fed to piston chamber 114. The energy stored during the lowering procedure is again available for a raising procedure. As long as the switch again occupies the neutral setting shown in FIG. 2, working cylinder 110 remains in its associated operational setting.

The cited multi-way valves 144, 180 and 184 can be considered together or individually as component parts of an independently controlled oil circuit. The non-return valves are thereby controlled by these component parts for an unsealing or opening procedure. In addition to hydraulic accumulator 138, a plurality of hydraulic accumulators (not shown) can also be used. If necessary, each hydraulic accumulator is associated with one specific movement requirement of the working tool. For example, one accumulator is used for the raising and lowering; and another accumulator is used for pivoting.

Instead of working cylinder 110 as is shown in FIG. 2, alternatively a hydraulic engine 210 can be connected at the point 1 with a working unit drivable in both directions. The working unit can procure linear operation either directly or through a gearing; however, it also can be coupled with a drive unit, for example, the wheel set of a vehicle. Upon reversal of the direction of movement, the kinetic energy fed in through hydraulic engine 210 to hydraulic accumulator 138 can then be fed in the other direction, again through the drive unit of the work unit which is to be fed energy. With a comparable device of this sort, hydrostatic braking energy can also be accumulated and stored.

While various embodiments have been chosen to illustrate the invention, it will be understood by those skilled in the art that various changes and modifications can be made therein without departing from the scope of the invention as defined in the appended claims.

What is claimed is:

1. A device for recovery of energy, comprising:
   a first hydraulically operable working cylinder for moving a working tool;
   a hydraulic circuit coupled to said working cylinder, said circuit including a pump in fluid communication with a hydraulic accumulator through a connecting line;
   two hydraulically openable non-return valves arranged in said connecting line; and
   a control unit coupled to said non-return valves and controlling said non-return valves alternatively and independently, said control unit including a first multi-way valve responsive to movement of the working tool.

2. A device according to claim 1 wherein
   a second hydraulically operable working cylinder moves the working tool with said first cylinder, each said cylinder having a piston chamber and a rod chamber,
   a link connects said rod chambers in fluid communication; and
   said multi-way valve is a four-position, three way valve.

3. A device according to claim 2 wherein
   each of said non-return valves comprises a closing part, said closing parts facing one another in said connecting line and being movable toward one another toward open settings thereof.

4. A device according to claim 2 wherein
   an impedance non-return valve is located in said connecting line between said openable non-return valves.

5. A device according to claim 4 wherein
   said impedance non-return valve has a continuously variable cross-section.

6. A device according to claim 2 wherein
   said piston chambers are in fluid communication through a second connecting line, said second connecting line having an impedance and a non-return valve therein.

7. A device according to claim 2 wherein
   said piston chambers are in fluid communication through a second connecting line, said second connecting line having a diaphragm and a non-return valve therein.

8. A device according to claim 2 wherein
   said first and second working cylinders are coupled to a control block which regulates fluid flow into and out of said working cylinders for control thereof.

9. A device according to claim 2 wherein
   said piston chamber of said second cylinder is in fluid communication with said hydraulic accumulator; and
   said rod chamber of said second cylinder is in fluid communication with a two-position, two-way valve which permits lowering of the working tool by disconnecting a fluid communication passage between said rod chamber of said second cylinder and said pump, and which is connected to said line between said rod chambers for quick changes, said fluid communication passage including and being operable by a non-return valve.

10. A device according to claim 2 wherein
    a three-position, two-way valve is arranged in said connecting line between said non-return valves and said piston chamber of said second cylinder, said three-position, two-way frees fluid communication between said piston chamber of said second cylinder and said non-return valves in an unoperational setting thereof.

11. A device according to claim 1 wherein
    a four-position, three-way valve is connected between said pump and said working cylinder, and is in fluid communication with an additional non-return valve having a closing part with an opening direction which is the same as one of said hydraulically operable non-return valves adjacent thereto in a fluid flow direction.

12. A device according to claim 11 wherein
    said additional non-return valve is hydraulically openable by a three-position, two-way valve.

13. A device according to claim 11 wherein
    a pressure limiting valve is arranged between one of said hydraulically operated non-return valves and said hydraulic accumulator.

14. A device according to claim 12 wherein
    a multi-way valve, controlled by a pressure switch, opens said three-position, two-way valve upon reaching a predetermined maximum accumulator-load pressure in said accumulator, and is in fluid communication with said first multi-way valve.

15. A device for recovery of energy, comprising:
    at least one hydraulic engine for moving a working tool;
    a hydraulic circuit coupled to said engine, said circuit including a pump in fluid communication with a hydraulic accumulator through a connecting line;
    two hydraulically openable non-return valves arranged in said connecting line; and
    a control unit coupled to said non-return valves and controlling said non-return valves alternatively and independently, said control unit including a first multi-way valve responsive to movement of the working tool.

16. A device according to claim 14 wherein
    each of said non-return valves comprises a closing part, said closing parts facing one another in said connecting line and being movable toward one another toward open settings thereof.

17. A device according to claim 15 wherein
    an impedance non-return valve is located in said connecting line between said openable non-return valves.

18. A device according to claim 17 wherein
    said impedance non-return valve has a continuously variable cross-section.

19. A device according to claim 15 wherein
a four-position, three-way valve is connected between said pump at said engine, and is in fluid communication with an additional non-return valve having a closing part with an opening direction which is the same as one of said hydraulically operable non-return valves adjacent thereto in a fluid flow direction.

20. A device according to claim 10 wherein
such additional non-return valve is hydraulically operable by a three-position, two-way valve.

21. A device according to claim 19 wherein
a pressure limiting valve is arranged between one of said hydraulically operated non-return valves and said hydraulic accumulator.

22. A device according to claim 20 wherein
a multi-way valve, controlled by a pressure switch, opens said three-position, two-way valve upon reaching a predetermined maximum accumulator-load pressure in said accumulator, and is in fluid communication with said first multi-way valve.

* * * * *

UNITED STATES PATENT AND TRADEMARK OFFICE
CERTIFICATE OF CORRECTION

PATENT NO. : 5,865,028
DATED : February 2, 1999
INVENTOR(S) : Bernd Klauk It is certified that error appears in the above-identified patent and that said Letters Patent is hereby corrected as shown below:

On the title page, item

"[22] PCT filed: Oct. 20, 1995"
should read
--[22]PCT filed: Oct. 21, 1995 --; and "[30]Foreign Application Priority Data
Oct. 20, 1994 [DE] Germany ... 44 37 598.0 "

should read
-- [30] Foreign Application Priority Data
Oct. 31, 1994 [DE] Germany ... 44 38 899.3 --

Signed and Sealed this

Sixth Day of July, 1999

*Attest:*

Q. TODD DICKINSON

*Attesting Officer*     *Acting Commissioner of Patents and Trademarks*